UNITED STATES PATENT OFFICE.

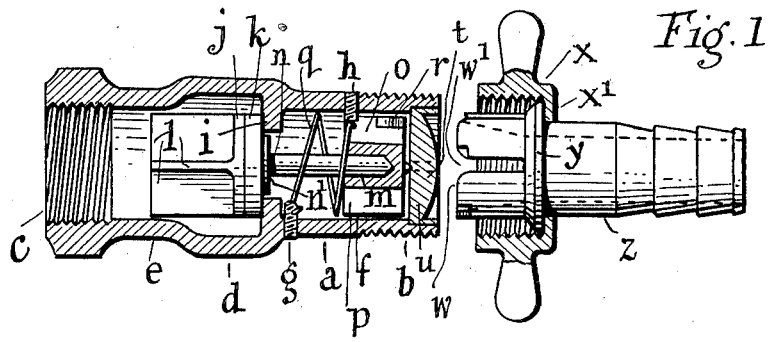
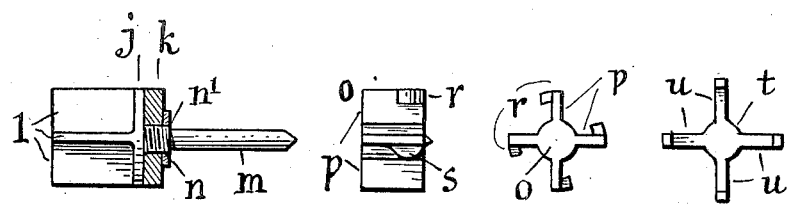
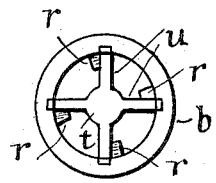 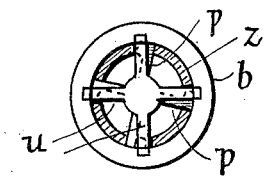
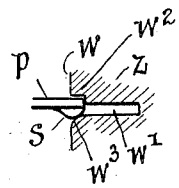 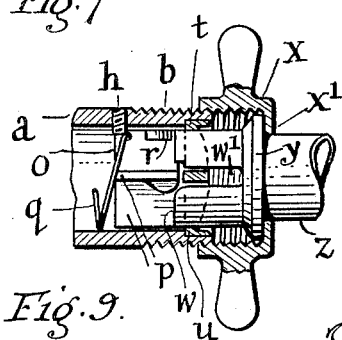

ELLIOTT BOLLAND, OF CHARTERS TOWERS, QUEENSLAND, AUSTRALIA.

VALVE AND CONNECTION THEREFOR.

1,087,713.  Specification of Letters Patent.  Patented Feb. 17, 1914.

Application filed July 17, 1913. Serial No. 779,639.

*To all whom it may concern:*

Be it known that I, ELLIOTT BOLLAND, a subject of the King of Great Britain and Ireland, &c., residing at Charters Towers, in the State of Queensland, Commonwealth of Australia, have invented certain new and useful Improvements in and Relating to Valves and Connections Therefor; and I do hereby declare the following to be a full, clear, and exact description of the invention, such as will enable others skilled in the art to which it appertains to make and use the same.

The invention relates to valves and taps and connections for their operation.

My construction is adapted for many situations including especially those in which it is desired to have a valve which will be guarded against being mischievously handled.

My valve cannot rattle in its casing, and the construction is also otherwise advantageous.

Glass, earthenware, metal, or other suitable material or combination of materials may be used.

The valve is opened by screwing up a collar or union nut carried by a tubular tail piece or the like, and is closed on its seat by fluid pressure when the collar is unscrewed. Screwing up the collar advances, into the valve casing end, the said tail piece,—of a hose for example—or the tubular end of a tap nozzle, or so on. the said end being slotted to pass a guard fixed in the valve casing outer end.

The valve has a winged shank adapted to slide in and be guided by part of the valve casing, a spindle projecting oppositely to the shank, and a winged spindle-cap adapted to slide in and be guided by another part of the casing. The valve has a renewable facing of leather, rubber, or other suitable material, so arranged as not to be likely to rapidly deteriorate. The aforesaid fixed guard is of special form. In the casing above the said spindle-cap is a spring connecting the cap and casing. These and other parts will now be described in detail.

In the accompanying drawings, Figures 1 and 9 are views partly in longitudinal section; Figs. 2 to 8 show details. In Fig. 1 the tail-piece is ready to enter the valve casing; in Fig. 9 it has begun to enter. Fig. 2 shows the valve with its winged shank and its facing, facing-washer and spindle. Figs. 3 and 4 show in side and end view respectively the winged cap which is mounted on the spindle end. Fig. 5 shows a guard to be fixed in the valve casing outer end. Fig. 6 shows the parts in Figs. 4 and 5 combined looking at the outer face of the guard which hides part of the cap; and Figs. 7, 8 and 9 show positions of parts during the operation of valve opening, the positions in Figs. 7 and 8 being retained until the union is disconnected to allow the valve to close.

$a$ is a valve casing having a screw threaded end $b$, for the union nut or collar, and having means as internal screw thread $c$, for connection to a fluid supply. Within the casing is a valve seat $i$ of any suitable design, and beyond it an enlargement $d$ forming a valve chamber. The part $j$ having a rubber or suitable facing $k$, forms the valve, having a shank composed of wings $l$ (usually four) extending beyond chamber $d$ to fit the casing loosely at $e$. The valve has a spindle $m$, screw-threaded at $n$ or arranged to carry a washer $n^1$ to hold down and protect facing $k$, the spindle tip entering a recess on the inner side of a cap $o$ having wings $p$ which fit the casing closely at $f$. Each wing has a side lug $r$ having a curved surface $s$. A screw $g$ or suitable stud in the valve casing retains an end of a spring $q$ having its other end fixed to cap $o$ as by entering a hole in the latter (see Fig. 1) so that when the cap has been slightly rotated from its normal position, the winding tension or torsion on the spring will return the cap to the normal position when the end $w$ of the tail piece is moved away from the cap. The guard $t$ is shown with radii $u$ to conceal wings $p$ when the valve is closed: this guard is fixed as by brazing or otherwise at the casing end, and—see Fig. 6—it leaves lugs $r$ uncovered. A screw $h$ in the valve casing stud is provided to project and act as a stop between two wings $p$, so that cap $o$ cannot be rotated except slightly, thus the spring will return it from the position illustrated in Fig. 7, to normal as in Fig. 6.

$x$ is the collar having a flange $x^1$, to press a flange $y$ on the nozzle $z$ so that end $w$ will be advanced into casing $a$, and open the valve by pressing cap $o$ on spindle $m$. Slots $w^1$ in end $w$, one to each radius $u$ are provided to allow of the latter being passed.

One side of each slot has a step $w^2$ Fig. 8, and the other side has a rounded face $w^3$. When end $w$ has advanced past the guard $t$ it meets the lugs $r$ and the pressure of rounded corners $w^3$ causes the cap to slightly rotate, bringing each wing $p$ into the position of Fig. 8 where the wings fit into the slot steps $w^2$. Then further inward pressure of the tail-piece slides the cap longitudinally and thus moves spindle $m$, and lifts the valve.

When to release and close the valve the collar $x$ is unscrewed the cap is rotated slightly and takes its normal position by the action of spring $q$. When the valve is open the flange $y$ presses the casing end $b$ and prevents leakage, or any other suitable known details for that purpose are used.

Having described this invention, what is claimed by Letters Patent is:—

1. In a device of the character described, the combination of a valve casing having a valve seat, a valve in the casing adapted to engage with the valve seat under fluid pressure, a spindle carried by the valve, a winged cap carried by said valve spindle, a winged guard for said winged cap secured in said casing, a torsion spring for normally holding said winged cap in true register with said winged guard; members carried by said winged cap projecting beyond the wings of said guard; a nozzle adapted to enter the valve casing past said wing guard and having means adapted to engage the winged cap projections to move the wing cap to be engaged by the nozzle; and a member for engaging with the valve casing and holding said nozzle, substantially as described.

2. In a device of the character described, the combination of a valve casing having a valve seat, a valve in the casing adapted to engage with the valve seat under fluid pressure, a spindle carried by the valve, a winged cap carried by said valve spindle, a winged guard for said winged cap secured in said casing, a torsion spring for normally holding said winged cap in true register with said winged guard; members carried by said winged cap projecting beyond the wings of said guard; a nozzle adapted to enter the valve casing past said winged guard and having portions adapted to engage the projecting members of the winged cap to position said cap to be engaged by the nozzle; and a member for engaging with the valve casing and holding said nozzle, substantially as described.

3. In a device of the character described, the combination of a valve casing having a valve seat, a valve in the casing adapted to engage with the valve under pressure, a spindle carried by the valve, a winged cap carried by said valve spindle, a winged guard for said winged cap secured in said casing, a torsion spring for normally holding said winged cap in true register with said winged guard; members carried by said winged cap projecting beyond the wings of said guard; a nozzle adapted to enter the valve casing past said winged guard and having curved faces adapted to engage the projecting members of the winged cap to move the cap to position for engagement by the nozzle, and shoulders formed on the nozzle adapted to engage with the wings of said cap to unseat the valve; and a member for engaging with the valve casing and holding said nozzle, substantially as described.

4. In a device of the character described, the combination of a valve casing having a valve seat, a valve in the casing adapted to engage with the valve seat under fluid pressure, a spindle carried by the valve, a winged cap carried by said valve spindle, a winged guard for said winged cap secured in said casing, a torsion spring for normally holding said winged cap in true register with said winged guard; a stud secured to the casing and adapted to limit the degree of rotation of the winged cap; laterally projecting members carried by the wings of said cap and projecting beyond the wings of said guard; a nozzle having members adapted to enter the casing through the winged guard and having curved faces adapted to engage the projecting members of the winged cap to move the same to position for engagement by the nozzle, and shoulders formed on the nozzle members adapted to engage with the wings of said cap to unseat the valve; and a member for engaging with the valve casing and holding said nozzle, substantially as described.

In witness whereof I have hereunto set my hand in the presence of two witnesses.

ELLIOTT BOLLAND.

Witnesses:
GROSVENOR ARUNDELL FRANCIS,
BASIL BARTON.